United States Patent
Foss et al.

(10) Patent No.: US 11,702,432 B2
(45) Date of Patent: Jul. 18, 2023

(54) METHOD OF MAKING AN ORGANOAMINOSILANE

(71) Applicant: Dow Silicones Corporation, Midland, MI (US)

(72) Inventors: Anthony E. Foss, Midland, MI (US); Jesse A. Maddock, Midland, MI (US); Brian D. Rekken, Midland, MI (US); Michael D. Telgenhoff, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 473 days.

(21) Appl. No.: 16/979,230

(22) PCT Filed: Feb. 13, 2019

(86) PCT No.: PCT/US2019/017754
§ 371 (c)(1),
(2) Date: Sep. 9, 2020

(87) PCT Pub. No.: WO2019/226207
PCT Pub. Date: Nov. 28, 2019

(65) Prior Publication Data
US 2020/0399291 A1 Dec. 24, 2020

Related U.S. Application Data

(60) Provisional application No. 62/675,439, filed on May 23, 2018.

(51) Int. Cl.
| | |
|---|---|
| *C07F 7/10* | (2006.01) |
| *B01J 4/00* | (2006.01) |
| *B01J 19/00* | (2006.01) |
| *C07F 7/02* | (2006.01) |

(52) U.S. Cl.
CPC ............... *C07F 7/10* (2013.01); *B01J 4/001* (2013.01); *B01J 19/0053* (2013.01); *C07F 7/025* (2013.01)

(58) Field of Classification Search
CPC .................................. C07F 7/01; C07F 7/025
USPC ................................................. 556/410, 413
See application file for complete search history.

(56) References Cited

U.S. PATENT DOCUMENTS

| | | | | |
|---|---|---|---|---|
| 3,467,686 A | * | 9/1969 | Edward | D06M 13/513 556/412 |
| 4,304,805 A | * | 12/1981 | Packo | F16L 55/175 48/194 |
| 8,669,387 B2 | * | 3/2014 | Miller | B01J 4/002 556/400 |
| 10,858,378 B2 | * | 12/2020 | Zhou | C07F 7/20 |
| 10,875,877 B2 | * | 12/2020 | Ketola | C07F 7/025 |
| 11,274,112 B2 | * | 3/2022 | Sanchez | H01L 21/02617 |

FOREIGN PATENT DOCUMENTS

WO 2017106632 6/2017

OTHER PUBLICATIONS

Lui et al. "Dehoudrocoupling of Ammonia and Silanes Catalyzed by Dimethyltianocene", Organometallics 1992, 11, 822-827.*
Janes F. Dunne, et al., "Tris(oxazolinyl)boratomagnesium-Catalyzed Cross-Dehydrocoupling of Organosilanes with Amines, Hydrazine, and Ammonia", Journal of the American Chemical Society, vol. 133, 2011, pp 16782-16785.
Michael S. Hill, et al., "Hetero-dehydrocoupling of silanes and amines by heavier alkaline earth catayis", Journal of the Royal Chemical Society, Chemical Science, vol. 4, 2013, pp. 4212-4222.
Aradhana Pindwal, et al., "Homoleptic divalent dialkyl Lanthanide-catalyzed cross-dehydrocoupling of silanes and amines", Organometallics, vol. 35, 2016, pp. 1674-1683.
Weiling, Xie, et al., "[(NHC)Yb{N(SiMe 3) 2} 2]—Catalyzed Cross-Dehydrogenative Coupling of Silanes with Amines" Angewandte Chemie, International Edition, vol. 51, No. 44, Oct. 4, 2012, pp. 11141-11144.
Search Report from corresponding Chinese Application No. 201980028848.6 dated Feb. 20, 2023.

* cited by examiner

*Primary Examiner* — Margaret G Moore
(74) *Attorney, Agent, or Firm* — Steven Mork

(57) ABSTRACT

A method of making an aminosilane, the method comprising: forming a reaction mixture comprising a hydridosilane, an amine and a dehydrogenative coupling catalyst in a reactor; subjecting the reaction mixture to conditions sufficient to cause a dehydrogenative coupling reaction between the hydridosilane and the amine to form the aminosilane and hydrogen gas; and venting the hydrogen gas; wherein the forming of the reaction mixture comprising the hydridosilane, the amine and the dehydrogenative coupling catalyst comprises continuously feeding the hydridosilane to the reactor containing the amine and the dehydrogenative coupling catalyst.

10 Claims, No Drawings

METHOD OF MAKING AN ORGANOAMINOSILANE

CROSS-REFERENCE TO RELATED APPLICATIONS

None.

BACKGROUND OF THE INVENTION

Silylamines have industrial applications including use as precursors for the deposition of silicon-containing films in photovoltaic and electronic applications. A significant industrial process for making trisilylamine (TSA) comprises the reaction of monochlorosilane with ammonia. In addition to TSA, this process produces chlorine-containing byproducts such as ammonium chloride. These byproducts are unwanted in the end-use applications. For example, halogen is detrimental in the process of forming silicon-containing films in chemical vapor deposition processes. Therefore, the lowest amount of halogen possible is desired in these applications.

Trisilylamine has also been produced through the reaction of disilylamine and removal of ammonia as a byproduct. However, halogen may also be present in silylamines produced from this process because halogen can be introduced in current processes to make the disilylamine.

Processes have been developed to remove halogen from silylamines once produced; however, the reduction of halogen from TSA is difficult. The processes used can add significant cost to the production of TSA, increase byproducts, reduce yields, and fail to eliminate halogen completely.

A process for producing trisilylamine has been taught that essentially eliminates halogen in the product. The process involves the reaction of an organoamino-functional silane or organoamino-functional disilane with ammonia. However, this process has limited commercial utility because known methods of producing the organoamino-functional silane or organoamino-functional disilane materials are limited. The methods are limited because the pressure of the hydridosilane added and the hydrogen gas produced in the methods limit the amount of hydridosilane that can be added to the reactor to react with the amine. The limitation of the amount of hydridosilane that can be added reduces the amount of the organoamino-functional silane or organoamino-functional disilane materials that can be produced on a commercial scale increasing production costs.

Therefore, a need exists for new processes to produce organoamino-functional silanes or organoamino-functional disilanes more economically in commercial quantities.

BRIEF SUMMARY OF THE INVENTION

The present invention is directed to a method of making an aminosilane comprising forming a reaction mixture comprising a hydridosilane, an amine and a dehydrogenative coupling catalyst in a reactor; subjecting the reaction mixture to conditions sufficient to cause a dehydrogenative coupling reaction between the hydridosilane and the amine to form the aminosilane and hydrogen gas; and venting the hydrogen gas from the reactor, wherein the forming of the reaction mixture comprising the hydridosilane, the amine and the dehydrogenative coupling catalyst comprises continuously feeding the hydridosilane to the reactor containing the amine and the dehydrogenative coupling catalyst.

The method of the invention allows for the more economical commercial production of organoamino-functional silanes or organoamino-functional disilanes by allowing for the continuous addition of hydridosilane to the amine in the process.

DETAILED DESCRIPTION OF THE INVENTION

The Brief Summary and Abstract are incorporated here by reference.

As used herein, "pre-catalyst" means a compound that when combined with a mixture of other compounds that reacts with one of the other compounds to form a catalyst for another reaction between the other reactants in the mixture.

As used herein, "continuous" or "continuously" in reference to the addition of a material to a reactor means that the material is added to the reactor by constant addition or in a series of aliquots over a period of time to replenish material already reacted with other reactants in the reactor until the reaction of the other reactants is complete or the reaction is ceased.

As used herein, "continuous" or "continuously" in reference to the venting of a byproduct gas from a reactor means that the gas is removed from to the reactor constantly or periodically over a period of time while a reaction is producing the gas.

A method of making an aminosilane, the method comprising:

forming a reaction mixture comprising a hydridosilane, an amine and a dehydrogenative coupling catalyst in a reactor;

subjecting the reaction mixture to conditions sufficient to cause a dehydrogenative coupling reaction between the hydridosilane and the amine to form the aminosilane and hydrogen gas; and venting the hydrogen from the reactor;

wherein the forming of the reaction mixture comprising the hydridosilane, the amine and the dehydrogenative coupling catalyst comprises continuously feeding the hydridosilane to the reactor containing the amine and the dehydrogenative coupling catalyst.

A reaction mixture comprising a hydridosilane, an amine and a dehydrogenative coupling catalyst is formed in a reactor.

The hydridosilane comprises silicon and hydrogen, alternatively comprises from 1 to 9, alternatively 1 to 4, alternatively 1 or 2, alternatively 1, alternatively 2, silicon atoms, alternatively the hydridosilane is monosilane ($SiH_4$), alternatively disilane ($H_3SiSiH_3$).

Examples of the hydridosilane include, but are not limited to, monosilane, disilane, trisilane, tetrasilane, pentasilane, neopentasilane, hexasilane, heptasilane, octasilane, nonasilane, octylsilane, nonylsilane, cyclopentasilane, cyclohexasilane and the isomers thereof. One skilled in the art would know how to make the silanes of the invention such as monosilane and disilane and some of the hydridosilanes are available commercially.

The amine comprises nitrogen, hydrogen, and carbon, alternatively the amine is a primary or secondary amine, alternatively the amine comprises nitrogen, hydrogen, and a hydrocarbyl group and is a primary or secondary amine, alternatively the amine is according to formula $$R^1{}_a NH_{3-a}, \quad (I)$$

where each $R^1$ is independently hydrocarbyl having from 1 to 18 carbon atoms, an organic polymer, or $—SiR^3{}_3$, where each $R^3$ independently is $C_{1-6}$ hydrocarbyl, alternatively methyl, ethyl, or propyl, alternatively methyl, and subscript a is 1 or 2.

The hydrocarbyl groups represented by $R^1$ typically have from 1 to 18, alternatively from 1 to 12, alternatively from 1 to 6, alternatively from 1 to 4, alternatively from 2 to 4, alternatively 3, carbon atoms. Acyclic hydrocarbyl groups having at least 3 carbon atoms can have a linear or branched structure. Examples of hydrocarbyl groups represented by R include, but are not limited to, alkyl, such as methyl, ethyl, propyl, isopropyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, hexyl, heptyl, octyl, nonyl, decyl, undecyl, dodecyl, pentadecyl, hexadecyl, icosyl; cycloalkyl, such as cyclopentyl, cyclohexyl, and methylcyclohexyl; aryl, such as phenyl and naphthyl; alkaryl such as tolyl and xylyl, aralkyl, such as benzyl and penethyl; alkenyl, such as vinyl, allyl, propenyl, butenyl, hexenyl, and octenyl; arylalkenyl, such as styryl and cinnamyl, and alkynyl, such as ethynyl and propynyl.

The hydrocarbyl groups represented by $R^3$ typically have from 1 to 6, alternatively from 1 to 3, alternatively from 1 to 3, alternatively 1, alternatively 2, alternatively 3, carbon atoms. Acyclic hydrocarbyl groups having at least 3 carbon atoms can have a linear or branched structure. Examples of hydrocarbyl groups represented by $R^3$ include, but are not limited to, those defined above for $R^1$ and having from 1 to 6 carbon atoms.

The organic polymers represented by $R^1$ may be, but are not limited to, polyalkylene, polyester, polyurethane, polyacrylate, and polysiloxane, and may have a linear, branched, star, or any other structure known in the art for organic polymers. The organic polymers may be made by methods known in the art. The amine or aminosilane functionality can be included in the polymer by copolymerization with a monomer with the amine or aminosilane functionality. For example, an amine comprising vinyl or allylic functionality can be copolymerized with other organic monomers including, but not limited to, other organic vinyl, ester, or acrylic monomers. Alternatively, the amine or aminosilane functionality may be grafted onto the polymer through reaction of an amine having a functional group which reacts with a group on the backbone of an existing polymer. For example, an aminosilane having any Si—H functionality may react with an unsaturated group of the polymer in a hydrosilylation reaction. One skilled in the art would understand how to make polymers with the amino or aminosilane functionality as defined by formula (I). Organic polymers comprising amine or aminosilane functionality are available commercially. When the compound of formula (I) contains silane functionality then the method becomes the reaction of a first aminosilane to produce a second aminosilane which is different from the first aminosilane.

Examples of the amine include, but are not limited to, the primary and secondary amines methylamine, ethylamine, isopropylamine, propylamine, 1-methylpropylamine, pentylamine, 1-methylbutylamine, hexylamine, phenylamine, cyclohexylamine, heptylamine, octylamine, nonylamine, decylamine, undecylamine, dodecylamine, pentadecylamine, octadecylamine, cosylamine, dimethylamine, diethylamine, diisopropylamine, dipropylamine, di-1-methylpropylamine, dipentylamine, di-1-methylbutylamine, dihexylamine, dicyclohexylamine, diheptylamine, dioctylamine, dinonylamine, didecylamine, diundecylamine, didodecylamine, dipentadecylamine, dioctadecylamine, dicosylamine, methylethylamine, methylpropylamine, methylisopropylamine, methylbutylamine, 1-methylpropylmethylamine, methylphenylamine, methylcyclohexylamine, methylocytlyamine, 1-methylheptylmethylamine, ethylethylamine, ethylpropylamine, ethylisopropylamine, ethylbutylamine, 1-methylpropylethylamine, ethylphenylamine, ethylcyclohexylamine, ethylocytlyamine, 1-methylheptylethylamine, propylbutylamine, isopropylbutylamine, propylisobutylamine, isopropylisobutylamine, propylpentylamine, isopropylpentylamine, propylphenylamine, isopropylphenylamine, isopropylcyclohexylamine, propyloctylamine, propyldodecylamine. One skilled in the art would know how to make the primary or secondary amine. Many of these compounds are available commercially.

The dehydrogenative coupling catalyst is any catalyst that will function to catalyze the dehydrogenative coupling reaction between the amine and the hydridosilane, alternatively the dehydrogenative coupling catalyst is a catalyst comprising BCF, Ca, Sr, Ba, magnesium or boron, alternatively magnesium or boron. The dehydrogenative coupling boron catalyst is according to formula $BR^4_3$, where each $R^4$ independently is a $C_{1-10}$ substituted or unsubstituted hydrocarbyl, alternatively $C_{4-8}$ substituted or unsubstituted hydrocarbyl, alternatively six carbon substituted or unsubstituted hydrocarbyl, alternatively substituted phenyl. The substituents comprising the substitution on the hydrocarbyl groups $R^4$ include halogen, alternatively F, Cl, or Br, alternatively F of Cl, alternatively F.

Examples of the dehydrogenative coupling catalyst comprising boron include, but are not limited to, trimethylborane, triethylborane, triphenylborane and tris(pentafluorophenyl)borane. In one embodiment, the catalysts is tris(pentafluorophenyl)borane. One skilled in the art would know how to prepare the dehydrogenative coupling catalyst comprising boron. Many of the dehydrogenative coupling catalysts comprising boron are available commercially.

The catalyst comprising magnesium is a bis(dihydrocarbylamino)magnesium represented by formula $(R^5_2N)_2Mg$, wherein each $R^5$ independently is a hydrocarbyl group having from 1 to 20 carbon atoms, alternatively from 1 to 12, alternatively from 1 to 6, alternatively from 1 to 4, alternatively from 2 to 4, alternatively 3, carbon atoms. The hydrocarbyl groups represented by $R^5$ are as described above for $R^1$ in formula (I) above.

Examples of the dehydrogenative catalyst comprising magnesium include, but are not limited to, bis(dimethylamino) magnesium, bis(diethylamino) magnesium, bis(diisopropylamino) magnesium, bis(dipropylamino) magnesium, bis(di-1-methylpropylamino) magnesium, bis(dipentylamino) magnesium, bis(di-1-methylbutylamino) magnesium, bis(dihexylamino) magnesium, bis(dicyclohexylamino) magnesium, bis(diheptylamino) magnesium, bis(dioctylamino) magnesium, bis(dinonylamino) magnesium, bis(didecylamino) magnesium, bis(diundecylamino) magnesium, bis(dodecylamino) magnesium, bis(dipentadecylamino) magnesium, bis(dioctadecylamino) magnesium, bis(dicosylamino) magnesium. One skilled in the art would know how to prepare the dehydrogenative coupling catalyst comprising magnesium. Many of the dehydrogenative coupling catalysts comprising magnesium are available commercially.

In one embodiment, the catalyst is formed by combining a pre-catalyst with the amine. In one embodiment, the pre-catalyst is a dihydrocarbylmagnesium compound of formula $R^5_2Mg$, wherein each $R^5$ independently is as described above for the catalyst, or a bis(dihydrocarbylamino)magnesium compound of formula $Mg(NR^6_2)_2$, where each $R^6$ independently is hydrocarbyl having from 1 to 10 carbon atoms or trimethylsilyl.

Hydrocarbyl groups represented by $R^6$ have 1 to 10 carbon atoms, alternatively 1 to 8 carbon atoms, alternatively 1 to 6 carbon atoms. Examples of hydrocarbyl groups represented by $R^6$ are as described above for $R^1$ having the requisite number of carbon atoms. In one embodiment, the groups represented by $R^6$, include, but are not limited to, alkyl having from 1 to 6 carbon atoms such as methyl, ethyl, propyl, butyl, pentyl, hexyl, phenyl, and their isomers. In another embodiment, the groups represented by $R^6$ are trimethylsilyl.

Examples of the pre-catalyst according to the formula $R^5{}_2Mg$ include, but are not limited to, dimethylmagnesium, diethylmagnesium, diisopropylmagnesium, dipropylmagnesium, di-1-methylpropylmagnesium, dipentylmagnesium, di-1-methylbutylmagnesium, dihexylmagnesium, dicyclohexylmagnesium, diheptylmagnesium, dioctylmagnesium, dinonylmagnesium, didecylmagnesium, diundecylmagnesium, dodecylmagnesium, dipentadecylmagnesium, dioctadecylmagnesium, dicosylmagnesium. In one embodiment the $R^5$ of the precatalyst is a branch alkyl group having from 2 to 6 carbon atoms, alternatively diisopropylmagnesium, alternatively dibutylmagnesium, alternatively di-isobutyl-magnesium, alternatively di-n-butylmagnesium.

Examples of pre-catalyst according to the formula $Mg(NR^6{}_2)_2$ include, but are not limited to, bis(diisopropylamino) magnesium, bis(diethylamino) magnesium, bis(diphenylamino) magnesium, bis(dioctylamino) magnesium, bis(ditrimethylsilylamino)magnesium, and those materials listed as the catalyst above.

The pre-catalyst, such as the dihydrocarbylmagnesium pre-catalyst may be prepared by methods know in the art. For example, the dihydrocarbylmagnesium pre-catalyst can be prepared by adding at least one equivalent of dioxane to a solution of hydrocarbylmagnesium halide.

The reactor is any reactor suitable for carrying out the reaction of the hydridosilane and the amine catalyzed by the dehydrogenative coupling catalyst and is equipped with an inlet and outlet for the introduction and venting of gases during the method.

In one embodiment, the reactor is equipped with a back pressure regulator, where the back pressure regulator will vent the reactor when the pressure in the reactor rises above a preset pressure. Typically the back pressure regulator would be integrated with the outlet from the reactor.

One skilled in the art would know how to select a reactor for conducting the method of the invention and a back pressure regulator. For example, in one embodiment the reactor comprises a Parr reactor having an inlet dip pipe for introducing the hydridosilane continuously into the reactor to contact the amine and catalyst already in the reactor, an outlet for venting byproduct hydrogen gas, where the outlet is equipped with a back pressure regulator on the outlet, and a condenser. The inlet may also be equipped with a pressure regulator to preserve a steady stream of hydridosilane to the reactor.

In one embodiment, the reaction mixture further comprise a solvent, alternatively a solvent that will solubilize the amine and the hydridosilane, alternatively a solvent selected from ether-based solvents, alkanes, aromatic solvents, and the like. The solvent is a liquid at the temperature and pressure conditions of the reaction. In one embodiment, the solvent is non-electron donating, alternately non-electron donating hydrocarbon, alternatively an alkane. The non-electron donating hydrocarbon or alkane solvent comprises from 5 to 18, alternatively from 6 to 10 carbon atoms. In one embodiment, the solvent is an electron donating solvent.

Examples of the solvent include alkanes, such as, but not limited to, pentane, hexane, heptane, octane, nonane, decane, undecane, dodecane pentadecane, hexadecane, isocane, and the isomers thereof, benzene, tetrahydrofuran, toluene, and mineral spirits. In one embodiment, the solvent comprises hexane, heptane, octane, or mineral spirits.

The reaction mixture may be formed by combining the amine, the hydridosilane, and the catalyst by methods known in the art. In one embodiment, the reaction mixture is formed by bubbling the hydridosilane through a mixture comprising the catalyst, the amine, and, optionally, the solvent.

The mixture of the amine, the dehydrogenative coupling catalyst, and the optional solvent may be formed by adding the pre-catalyst and/or the dehydrogenative coupling catalyst to the amine with mixing. The dehydrogenative coupling catalyst or pre-catalyst and the amine may be premixed in a flask to form a catalyst-amine mixture, and then the catalyst-amine mixture added to the reactor. Or, the catalyst and/or pre-catalyst may be added to the reactor containing the amine with mixing in the reactor.

The reaction mixture is subjected to conditions sufficient to cause a dehydrogenative coupling reaction between the hydridosilane and the amine to form the aminosilane and hydrogen gas. Conditions sufficient are temperatures and pressures for a period of time to cause the dehydrogenative coupling reaction between the hydridosilane and the amine, alternatively a temperature from 70 to 170° C., alternatively from 90 to 150° C., alternatively from 120 to 140° C., at pressures greater than 1 atmosphere, alternatively >4 atmospheres, alternatively from 65 to 1520 kiloPascals (kPa), alternatively 410 to 900 kPa, alternatively 480-620 kPa, and for a time up to 24 hours, alternatively up to 6 hours, alternatively up to 3 hours, alternatively from 5 minutes to 3 hours, alternatively from 0.5 to 3 hours. One skilled in the art would know how to subject the reaction mixture to the conditions sufficient to cause the dehydrogenative coupling reaction between the hydridosilane and the amine to form the aminosilane and hydrogen gas.

The hydridosilane is continuously fed to the reactor containing the amine and the dehydrogenative coupling catalyst to form the reaction mixture comprising the hydridosilane, the amine and the dehydrogenative coupling catalyst.

The hydridosilane may be fed to the reactor to form the reaction mixture by bubbling the hydridosilane through the catalyst-amine mixture by flowing the hydridosilane through a dip pipe with the end (gas exit) of the dip pipe positioned near the bottom of the amine-catalyst mixture. In another embodiment, the hydridosilane may be introduced to the bottom of the reactor through and inlet at the bottom of the reactor. Other known means of bubbling a gas through a mixture may be used to bubble the hydridosilane through the catalyst-amine mixture.

In one embodiment, the reaction mixture is formed by combining the amine and the dehydrogenative coupling catalyst or pre-catalyst by methods known in the art to form an amine-catalyst mixture. The amine-catalyst mixture is then subjected to the conditions sufficient to cause a dehydrogenative coupling reaction between the hydridosilane and the amine in a reactor by methods known in the art. The hydridosilane is then continuously bubbled through the amine-catalyst mixture at the conditions sufficient to cause a dehydrogenative coupling reaction between the hydridosilane and the amine and to form the aminosilane and hydrogen gas, wherein the hydrogen gas is continuously vented from the reactor. The continuous bubbling of the hydridosilane is to replace the previously introduced hydridosilane that has been reacted with the amine to form the aminosilane and hydrogen.

The solvent can be added with the amine, the hydridosilane, and the dehydrogenative coupling catalyst in any order. In one embodiment, the solvent is combined with the amine and the dehydrogenative coupling catalyst prior to combining with the hydridosilane.

The hydrogen gas is vented, alternatively the hydrogen gas is continuously vented, from the reactor. In one embodiment, the venting is performed by including a back pressure regulator in the outlet for the hydrogen gas. The pressure is regulated by the regulators release or venting of gas when the pressure at the regulator is above a particular set pressure. Because of the pressure regulator and the venting of the hydrogen gas, the method can be carried out continuously, or semi-continuously, and is not limited by hydrogen gas production and the concomitant pressure increases from that gas. The pressure regulator may be any regulator known in the art for releasing or venting a product or byproduct gas being produced by a reaction in a reactor. For example, the hydrogen may be vented as it is produced by opening an outlet at the top of the reactor. Alternatively, the gas may be vented through a pressure regulator, such as a pressure relief valve, when the pressure gets above a certain limit. In one embodiment, the venting of the hydrogen gas comprises conducting the hydrogen gas to a storage receptacle or to another chemical process.

The pressure at which the back pressure regulator is set to vent gas from the reactor through the outlet can vary, alternatively the pressure of the back pressure regulator is greater than 1520 kiloPascals (kPa), alternatively greater than 900 kPa, alternatively greater than 620 kPa.

The rate the hydridosilane is fed to the reactor may vary. The feed rate may vary depending upon the size of the reactor, quantity of reactants, and temperature and pressure conditions in the reactor. One skilled in the art would know how to adjust the feed rate of the hydridosilane using methods known in the art. In one embodiment, the feed rate of the hydridosilane to the reactor is at least 0.005 standard litre per minute (SLM), alternatively at least 0.05 SLM, alternatively 0.005 to 5 SLM.

The amine and the hydridosilane are combined in a molar ratio of amine to hydridosilane of from 0.001 to 1000, alternatively from 0.01 to 100, alternatively from 0.1 to 10, alternatively from 0.33 to 3. In one embodiment, the hydridosilane is combined in molar excess compared to the amine, alternatively >5% molar excess, alternatively >20% molar excess, alternatively 25% or greater molar excess, compared to the amine. The molar excess of the hydridosilane is combined by adjusting the time of the feed considering the mass flow rate of the hydridosilane to provide the desired molar excess compared to the amine combined/added to the reactor.

The catalyst comprising magnesium or boron is combined in a catalytic effective amount. A catalytic effective amount of catalyst comprising magnesium or boron means an amount that will catalyze the reaction of the amine and the hydridosilane at the specific concentration of amine and hydridosilane, alternatively an amount of catalyst that is up to 10% (w/w), alternatively from 0.0001 to 5% (w/w), alternatively from 0.01 to 2% (w/w), alternatively from 0.1 to 1% (w/w), based on the weight of the amine.

The hydrogen gas is vented from the reactor. The rate the hydrogen gas is vented from the reaction can vary depending upon, for example, the size of the reactor, the quantity of the reactants, and the temperature and pressure conditions. In one embodiment, the hydrogen gas is vented from the reactor within a range that is from 20% (v/v) less than to 20% (v/v) more than, alternatively 10% (v/v) less than to 10% (v/v) more than, alternatively 5% (v/v) less than to 5% (v/v) more than the rate the hydridosilane is fed to the reactor.

The reaction mixture is typically formed with mixing. The mixing can vary depending upon the conditions, quantity of reactants, and the reactor. The mixing can be accomplished by methods known in the art. For example, the mixing may be accomplished by the agitation caused by the bubbling of the hydridosilane through the amine-catalyst mixture, alternatively the mixing may be caused by a magnetic stirring bar, alternatively a paddle mixer. One skilled in the art would know how to mix the hydridosilane, the amine, and the dehydrogenative coupling catalyst.

The reaction may also be under inert conditions by bubbling an inert gas, such as argon, through the amine-catalyst mixture prior to, alternatively prior to and during, the addition of the hydridosilane to the form the reaction mixture.

The method may further comprise recovering the aminosilane and/or hydrogen produced. Known methods may be used to recover the aminosilane such as distillation and chromatography. In one embodiment, the aminosilane is recovered and purified by distillation.

The method of the invention is useful to produce organoaminosilanes containing little or no halogen atoms. The aminosilanes may be used in various industrial processes as precursors to make additional aminosilanes by, for example, reaction of the aminosilane with ammonia, or as precursors for use in the deposition of silicon-containing films in processes such as chemical vapor deposition.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages and ratios are in wt. % unless otherwise noted.

TABLE 2

List of abbreviations used in the examples.

| Abbreviation | Word/meaning | Abbreviation | Word/meaning |
| --- | --- | --- | --- |
| g | gram | Min. | minutes |
| Me | methyl | mL | milliliters |
| wt | weight | s | seconds |
| % | percent | kPa | kiloPascals |
| mol | mole | L | Liter |
| hr | hour | rpm | Revolutions per minute |
| ° C. | degrees Celsius | SLM | Standard liters per minute |

Example 1

In an inert glove box, 1.7 g of dibutylmagnesium was slowly added to a flask containing a stirred mixture of 60 g diisopropylamine and 459 g of 1,4-diisopropylbenzene at room temperature. The resulting mixture was then loaded into a 1.5 L Parr reactor. The reactor was pressured up to 551.6 kPa with argon and a backpressure regulator was set to 580 kPa on the reactor's vent line. The reactor was then heated to 130° C. Monosilane was fed to the reactor through a dip pipe at a rate of 0.13 SLM with agitation of 800 rpm. The monosilane feed/head space venting continued for 1.5 hours. The reactor was then cooled, the process was purged of any residual pyrophoric gas, and the material was sampled. Approximately 67 g of diisopropylaminosilane was collected, amounting to a yield of 86% with respect to both diisopropylamine and silane. Ratio of diisopropylaminosilane to diisopropylamine to bis-diisopropylaminosilane in product =48:1:1.

Comparative Example 1

In a flask, in an inert glove box, 2.9 g of dibutylmagnesium was slowly added to a stirred mixture of 20 g diisopropylamine and 153 g 1,4-diisopropylbenzene at room temperature. The resulting mixture was then loaded into a 1.5 L Parr reactor. The reactor was chilled down to −10° C. and vacuum was pulled on the reactor headspace. The reactor was then heated to 130° C. Monosilane was fed to the reactor through a dip pipe at a rate of 0.13 SLM with agitation of 800 rpm. The monosilane feed continued for 0.75 hours until pressure in the reactor reached 94 psig. The reactor was then cooled, the process was purged of any residual pyrophoric gas, and the material was sampled. Approximately 14 g of diisopropylaminosilane was collected, amounting to a yield of 53% with respect to diisopropylamine and 44% with respect to silane. Ratio of diisopropylaminosilane to diisopropylamine to bis-diisopropylaminosilane in product=68:24:7.

Example 2

In an inert glove box, 1.7 g of dibutylmagnesium was slowly added to a stirred mixture of 120 g diisopropylamine and 395 g 1,4-diisopropylbenzene at room temperature. The resulting mixture was then loaded into a 1.5 L Parr reactor. The reactor was pressured up to 551.6 kPa with argon and a backpressure regulator was set to 580 kPa on the reactor's vent line. The reactor was then heated to 130° C. Monosilane was fed to the reactor through a dip pipe at a rate of 0.13 SLM with agitation of 800 rpm. The monosilane feed/head space venting continued for 3.3 hours. The reactor was then cooled, the process was purged of any residual pyrophoric gas, and the material was sampled. Approximately 85 g of diisopropylaminosilane was collected, amounting to a yield of 54% with respect to both diisopropylamine and silane. Ratio of diisopropylaminosilane to diisopropylamine to bis-diisopropylaminosilane in product =46:1:3.

Example 3

In an inert glove box, 1.7 g of butylethylmagnesium was slowly added to a stirred mixture of 120g diisopropylamine and 395 g 1,4-diisopropylbenzene at room temperature. The resulting mixture was then loaded into a 1.5 L Parr reactor. The reactor was pressured up to 551.6 kPa with argon and a backpressure regulator was set to 580 kPa on the reactor's vent line. The reactor was then heated to 130° C. Monosilane was fed to the reactor through a dip pipe at a rate of 0.13 SLM with agitation of 800 rpm. The monosilane feed/head space venting continued for 3.3 hours. The reactor was then cooled, the process was purged of any residual pyrophoric gas, and the material was sampled. Approximately 38 g of diisopropylaminosilane was collected, amounting to a yield of 24% with respect to both diisopropylamine and silane. Ratio of diisopropylaminosilane to diisopropylamine to bis-diisopropylaminosilane in product =94:3:3.

Example 4

In an inert glove box, 1.7 g of butylethylmagnesium was slowly added to a stirred mixture of 240 g diisopropylamine and 270 g 1,4-diisopropylbenzene at room temperature. The resulting mixture was then loaded into a 1.5 L Parr reactor. The reactor was pressured up to 551.6 kPa with argon and a backpressure regulator was set to 580 kPa on the reactor's vent line. The reactor was then heated to 130° C. Monosilane was fed to the reactor through a dip pipe at a rate of 0.13 SLM with agitation of 800 rpm. The monosilane feed/head space venting continued for 6.7 hours. The reactor was then cooled, the process was purged of any residual pyrophoric gas, and the material was sampled. Approximately 111 g of diisopropylaminosilane was collected, amounting to a yield of 36% with respect to both diisopropylamine and silane. Ratio of diisopropylaminosilane to diisopropylamine to bis-diisopropylaminosilane in product =84:1:15.

Example 5

In an inert glove box, 1.7 g of dibutylmagnesium was slowly added to a stirred flask containing 504 g diisopropylamine at room temperature. The resulting mixture was then loaded into a 1.5 L Parr reactor. The reactor was pressured up to 551.6 kPa with argon and a backpressure regulator was set to 580 kPa on the reactor's vent line. The reactor was then heated to 120° C. Monosilane was fed to the reactor through a dip pipe at a rate of 0.270 SLM with agitation of 800 rpm. The monosilane feed/head space venting continued for 8.6 hours. The reactor was then cooled, the process was purged of any residual pyrophoric gas, and the material was sampled. Approximately 368 g of diisopropylaminosilane was collected, amounting to a yield of 56% with respect to diisopropylamine and 45% with respect to silane. Ratio of diisopropylaminosilane to diisopropylamine to bis-diisopropylaminosilane in product=20:10:3. This example shows the process run solventless.

Example 6

In an inert glove box, 1.7 g of butylethylmagnesium was slowly added to a stirred mixture of 307.5 g diisopropylamine and 202.5 g mineral spirits at room temperature. The resulting mixture was then loaded into a 1.5 L Parr reactor. The reactor was pressured up to 551.6 kPa with argon and a backpressure regulator was set to 580 kPa on the reactor's vent line. The reactor was then heated to 150° C. Monosilane was fed to the reactor through a dip pipe at a rate of 0.270 SLM with agitation of 800 rpm. The monosilane feed/head space venting continued for 5.3 hours. The reactor was then cooled, the process was purged of any residual pyrophoric gas, and the material was sampled. Approximately 135 g of diisopropylaminosilane was collected, amounting to a yield of 34% with respect to diisopropylamine and 27% with respect to silane. Ratio of diisopropylaminosilane to diisopropylamine to bis-diisopropylaminosilane in product=43:15:42. This example shows the use of mineral spirits as solvent and a 150° C. temperature.

Example 7

In an inert glove box, 1.7 g of butylethylmagnesium was slowly added to a stirred mixture of 307.5 g diisopropylamine and 202.5 g mineral spirits at room temperature. The resulting mixture was then loaded into a 1.5 L Parr reactor. The reactor was pressured up to 551.6 kPa with argon and a backpressure regulator was set to 580 kPa on the reactor's vent line. The reactor was then heated to 130° C. Monosilane was fed to the reactor through a dip pipe at a rate of 0.270 SLM with agitation of 800 rpm. The monosilane feed/head space venting continued for 4.2 hours. The reactor was then cooled, the process was purged of any residual pyrophoric gas, and the material was sampled. Approximately 225 g of diisopropylaminosilane was collected, amounting to a yield of 56% with respect to both diisopropylamine and silane. Ratio of diisopropylaminosilane to diisopropylamine to bis-diisopropylaminosilane in product =34:19:4.

Example 8

In an inert glove box, 1.7 g of butylethylmagnesium was slowly added to a stirred mixture of 307.5 g diisopropylamine and 202.5 g mineral spirits at room temperature. The resulting mixture was then loaded into a 1.5 L Parr reactor. The reactor was pressured up to 551.6 kPa with argon and a backpressure regulator was set to 580 kPa on the reactor's vent line. The reactor was then heated to 130° C. Monosilane was fed to the reactor through a dip pipe at a rate of 0.270 SLM with agitation of 800 rpm. The monosilane feed/head space venting continued for 5.3 hours. The reactor was then cooled, the process was purged of any residual pyrophoric gas, and the material was sampled. Approximately 273 g of diisopropylaminosilane was collected, amounting to a yield of 68% with respect to diisopropylamine and 55% with respect to silane. Ratio of diisopropylaminosilane to diisopropylamine to bis-diisopropylaminosilane in product=21:5:3.

The invention claimed is:

1. A method of making an aminosilane, the method comprising:
   forming a reaction mixture comprising a hydridosilane selected from monosilane and disilane, an amine and a dehydrogenative coupling catalyst in a reactor;
   subjecting the reaction mixture to conditions sufficient to cause a dehydrogenative coupling reaction between the hydridosilane and the amine to form the aminosilane and hydrogen gas; and
   venting the hydrogen gas from the reactor;
   wherein the forming of the reaction mixture comprising the hydridosilane, the amine and the dehydrogenative coupling catalyst comprises continuously feeding the hydridosilane to the reactor by bubbling it through the amine and the dehydrogenative coupling catalyst.

2. A method according to claim 1, wherein the venting of the hydrogen gas is continuous.

3. A method according to claim 1, wherein the aminosilane is an organoaminosilane or trisilylamine.

4. A method according to claim 1, wherein the amine is a primary or secondary amine according to formula (I)

$$R_a NH_{3-a},\qquad (I)$$

where each R independently is hydrocarbyl having from 1 to 18 carbon atoms and subscript a is 1 or 2.

5. A method according to claim 1, wherein the forming of the reaction mixture comprising the hydridosilane, the amine and the dehydrogenative coupling catalyst, comprises the addition of a dehydrogenative coupling pre-catalyst to the reactor and forming the dehydrogenative coupling catalyst from the dehydrogenative coupling pre-catalyst in the reactor.

6. A method according to claim 5, wherein the dehydrogenative coupling pre-catalyst is ethylmethylmagnesium, propylmethylmagnesium, propylethylmagnesium, butylmethylmagnesium, butylethylmagnesium, dibutylmagnesium or butylpropylmagnesium.

7. A method according to claim 1, further comprising a) or b)
   a) wherein the reaction mixture further comprises a solvent;
   b) wherein the conditions sufficient to cause the dehydrogenative coupling reaction between the hydridosilane and the amine to form the aminosilane and hydrogen gas include a temperature from 70 to 170° C. and a pressure from above 1 atmosphere.

8. method according claim 7, wherein the solvent is a hydrocarbon solvent having from 5 to 30 carbon atoms, the temperature is from 90 to 150° C., and the pressure is above 4 atmospheres.

9. A method according to claim 1, wherein the aminosilane is an organoaminosilane according to formula (II)

$$(H_3Si)_{3-a}NR_a,\qquad (II)$$

or formula (III)

$$(R_aNH_{2-a})_b Si_2 H_{6-b} \qquad (III)$$

where each R independently is hydrocarbyl having from 1 to 18 carbon atoms and subscript a is 1 or 2, and subscript b is 1 or 2.

10. A method according claim 1, wherein the reactor is equipped with a gas vent, an inlet for hydridosilane gas, where the inlet is positioned so that the hydridosilane will bubble through the amine in the reactor, and a heater.

* * * * *